United States Patent [19]
Hamilton, Jr. et al.

[11] Patent Number: 6,075,889
[45] Date of Patent: Jun. 13, 2000

[54] COMPUTING COLOR SPECIFICATION (LUMINANCE AND CHROMINANCE) VALUES FOR IMAGES

[75] Inventors: John F. Hamilton, Jr.; James E. Adams, Jr., both of Rochester, N.Y.

[73] Assignee: Eastman Kodak Company, Rochester, N.Y.

[21] Appl. No.: 09/096,632

[22] Filed: Jun. 12, 1998

[51] Int. Cl.[7] ..................................................... G06K 9/00
[52] U.S. Cl. .......................................... 382/167; 382/274
[58] Field of Search ..................................... 382/162, 163, 382/164, 165, 166, 167, 173, 176, 180, 181, 190, 195, 209, 224, 225, 226, 227, 229, 232, 243, 248, 254, 266, 274, 275, 276, 277, 278, 279, 280, 281, 286, 293, 299, 300, 308, 312, 317, 318, 319, 321, 324, 241; 348/407, 413, 416, 699, 402; 600/473, 478; 607/89; 356/363, 374; 358/515

[56] References Cited

U.S. PATENT DOCUMENTS

| | | |
|---|---|---|
| 3,971,065 | 7/1976 | Bayer . |
| 5,631,703 | 5/1997 | Hamilton et al. . |
| 5,978,511 | 11/1999 | Horiuchi et al. .......................... 382/241 |

*Primary Examiner*—Bijan Tadayon
*Attorney, Agent, or Firm*—Raymond L. Owens

[57] ABSTRACT

In apparatus for processing a digital color image value originally obtained from an image sensor or the like having color image pixels aligned in rows and columns having diagonal pixels with sufficient information to permit luminance or chrominance estimation the digital image having at least three separate color values but only one color value for each image pixel location, such apparatus computing the luminance or chrominance values for each image pixel. The apparatus stores the digital image and includes a processor operatively associated with the stored image and responsive to said stored measured digital color image values for computing low frequency luminance or chrominance values. In response to the computed low frequency luminance or chrominance values the Laplacian second-order and gradient values in at least two image orientations are computed from neighboring image pixels. The Laplacian second-order and the gradient values are combined to define a value for each image pixel such that there are sets of values with each value corresponding to a classifier and for selecting a preferred orientation from a group of orientations for the interpolation based upon the classifier. Finally, in response to the preferred orientation and the measured digital image for estimating the luminance or chrominance value for each corresponding image pixel.

19 Claims, 7 Drawing Sheets

| $Cb_{11}$ | $Cb_{12}$ | $Ca_{13}$ | $Ca_{14}$ | $Cb_{15}$ |
|---|---|---|---|---|
| $Cb_{21}$ | $Cb_{22}$ | $Ca_{23}$ | $Ca_{24}$ | $Cb_{25}$ |
| $Ca_{31}$ | $Ca_{32}$ | $\boxed{Cb_{33}}$ | $Cb_{34}$ | $Ca_{35}$ |
| $Ca_{41}$ | $Ca_{42}$ | $Cb_{43}$ | $Cb_{44}$ | $Ca_{45}$ |
| $Cb_{51}$ | $Cb_{52}$ | $Ca_{53}$ | $Ca_{54}$ | $Cb_{55}$ |

FIG. 9

COMPUTING COLOR SPECIFICATION (LUMINANCE AND CHROMINANCE) VALUES FOR IMAGES

FIELD OF THE INVENTION

This invention relates to the field of electronic imaging and is particularly suitable to electronic still imaging with improved luminance and chrominance pixel values from a measured digital image originally produced by an image sensor.

BACKGROUND OF THE INVENTION

In electronic color imaging, it is desirable to simultaneously capture image data in three color planes, usually red, green and blue, although cyan, magenta, and yellow can also be used. When the three color planes are combined, it is possible to create high-quality color images. Capturing these three sets of image data can be done in a number of ways. In electronic photography, this is sometimes accomplished by using a single two dimensional array of sensors that are covered by a pattern of red, green and blue filters. This type of sensor is known as a color filter array or CFA. Below is shown the red (R), green (G) and blue (B) pixels as are commonly arranged on a CFA sensor.

When a color image is captured using a CFA, it is necessary to interpolate the red, green and blue values so that there is an estimate of all three color values for each sensor location. Once the interpolation is done, each picture element, or pixel, has three color values and can be processed by a variety of known image processing techniques depending on the needs of the system. Some examples of the reasons for processing are to do image sharpening, color correction or halftoning.

The following shows how red green and blue pixels can be arranged in a particular color filter array pattern, hereinafter referred to as the Bayer color filter array. For a more detailed description see U.S. Pat. No. 3,971,065 to Bayer.

$$
\begin{array}{cccc}
G & R & G & R \\
B & G & B & G \\
G & R & G & R \\
B & G & B & G
\end{array}
$$

In processing color digital images produced by an image sensor, color specification values such as, for example, luminance and chrominance values for each pixel need to be computed. One of the problems found in processing color image values produced by an image sensor is that the luminance values for pixels on the edge of a feature of an image can be inaccurately interpolated.

SUMMARY OF THE INVENTION

An object of this invention is to provide an improved apparatus which produces color specification values for pixels particularly those on the diagonal edge of a feature of the digital image.

This object is achieved in apparatus for processing a digital color image value originally obtained from an image sensor or the like having color image pixels aligned in rows and columns having diagonal pixels with sufficient information to permit luminance estimation the digital image having at least three separate color values but only one color value for each image pixel location, such apparatus computing the luminance values for each image pixel, comprising:

means for storing the digital image;

processor means operative with said storing means and responsive to said stored measured digital color image values for computing low frequency luminance values;

means responsive to the computed low frequency luminance values for obtaining Laplacian second-order and gradient values in at least two image orientations from neighboring image pixels;

means for combining the Laplacian second-order and the gradient values to define a value for each image pixel in the kernel such that there are sets of values with each value corresponding to a classifier and for selecting a preferred orientation from a group of orientations for the interpolation based upon the classifier; and means responsive to the preferred orientation and the measured digital image for estimating a portion of the color specification for each corresponding image pixel.

ADVANTAGES

An advantage of this invention is that it is computationally efficient both in execution time and memory storage requirements for producing improved luminance or chrominance values. It is another advantage of the present invention to use the combination of the Laplacian second-order and gradient values to produce a classifier which substantially reduces artifacts (color interpolation) in output image are substantially reduced.

DETAILED DESCRIPTION OF THE INVENTION

For any given pixel, the luminance and chrominance values constitute color specification for a pixel. For purposes of this disclosure, the term "portion of a color specification" will refer to a pixel's luminance or chrominance values.

Single-sensor electronic cameras employing color filter arrays are well known. Elements not specifically shown or described herein may be selected from those known in the art.

Figure 1:
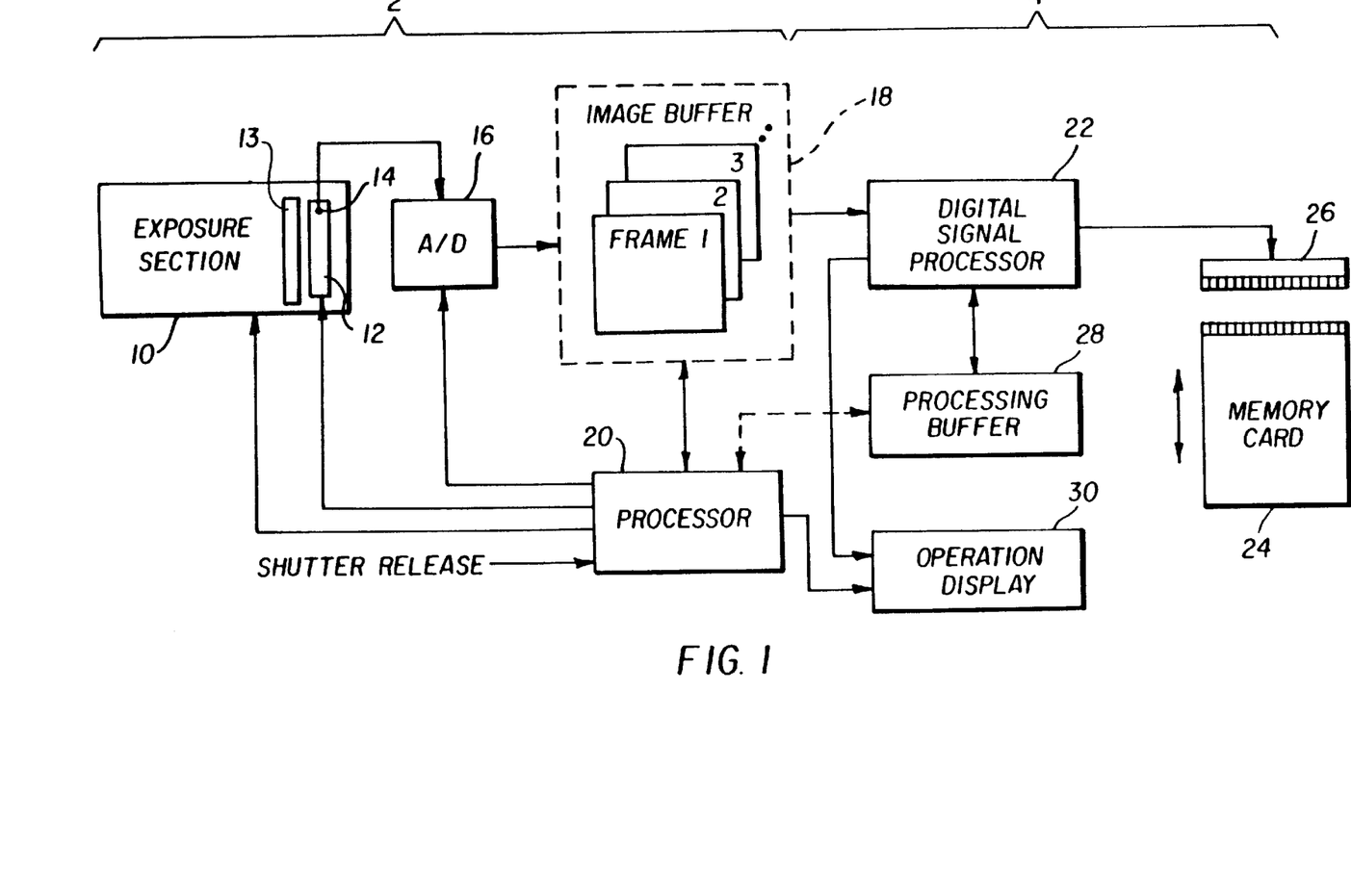
FIG. 1 is a block diagram of an electronic still camera employing interpolation processing according to the invention.
Figure 2:
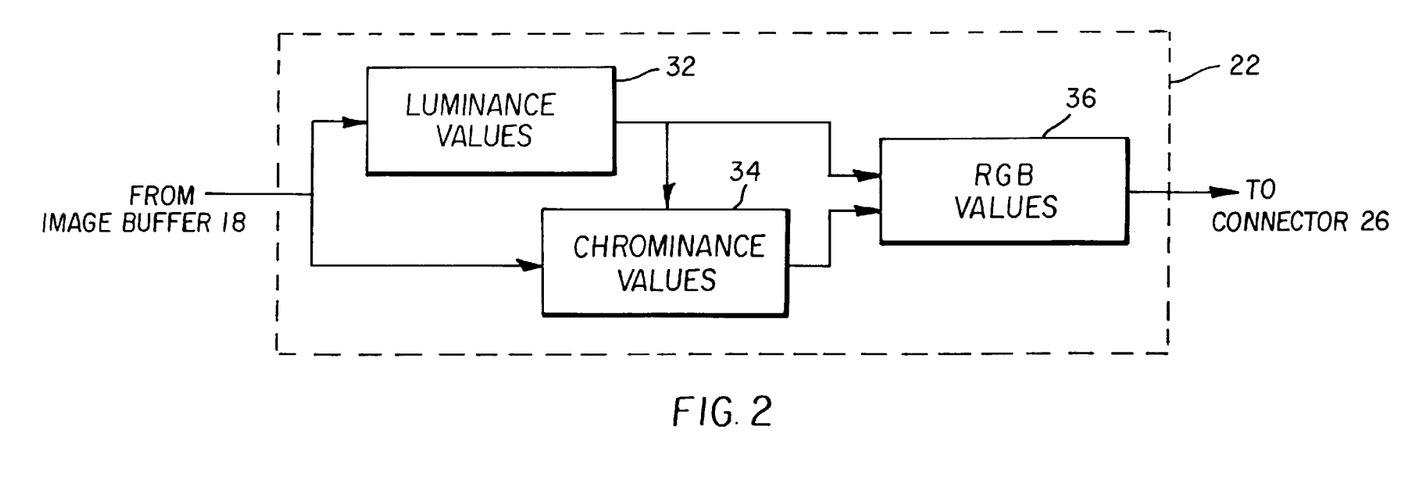
FIG. 2 is a block diagram of the logic of the interpolation processing technique for producing luminance in accordance with the invention.

Referring initially to FIGS. 1 and 2, an electronic still camera 1 is divided generally into an input section 2 and an interpolation and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperture, and a shutter, which regulates exposure time. The image sensor 12, which includes a two-dimensional array of colored photosites or pixels corresponding to picture elements of the image, can be a conventional charge-coupled device (CCD) using either well-known interline transfer or frame transfer techniques. The image sensor 12 is covered by a color filter array (CFA) 13. For an example of a color filter array which is particularly suitable for use in the present invention reference is made to commonly-assigned U.S. Pat. No. 5,631,703 to Hamilton et al, the disclosure of which is incorporated by reference. The image sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image value from the analog input signal for each picture element. The digital values are applied to an image buffer 18, which may be a random access memory (RAM) with storage capacity for a plurality of still images.

A control processor 20 generally controls the input section 2 of the electronic still camera 1 by initiating and controlling exposure (by operation by the diaphragm and shutter (not shown) in the exposure section 10), by generating the horizontal and vertical clocks needed for driving the image sensor 12 and for clocking image information therefrom, and by enabling the A/D converter 16 in conjunction with the image buffer 18 for each value segment relating to a picture element. The control processor 20 typically includes a microprocessor and appropriate memory coupled to a system timing circuit. Once a certain number of digital image values have been accumulated in the image buffer 18, the stored values are applied to a digital signal processor 22, which controls the throughput processing rate for the interpolation and recording section 4 of the electronic still camera 1. The digital signal processor 22 applies an interpolation algorithm to the digital image values, and sends the interpolated values to a conventional, removable memory card 24 via a connector 26. Although an electronic still camera 1 has been described as including a digital signal processor, it will be understood that the digital signal processor 22 does not have to be an integral part of the electronic still camera 1. A requirement of this invention is that the digital image values are provided from an image sensor.

Since the interpolation and related processing ordinarily occurs over several steps, the intermediate products of the processing algorithm are stored in a processing buffer 28. The processing buffer 28 may also be configured as part of the memory space of the image buffer 18. The number of image values needed in the image buffer 18 before digital processing can begin depends on the type of processing, that is, for a neighborhood interpolation to begin, a block of values including at least a portion of the image values comprising a video frame must be available. Consequently, in most circumstances, the interpolation may commence as soon as the requisite block of picture elements is present in the buffer 18.

The input section 2 operates at a rate commensurate with normal operation of the electronic still camera 1 while interpolation, which may consume more time, can be relatively divorced from the input rate. The exposure section 10 exposes the image sensor 12 to image light for a time period dependent upon exposure requirements, for example, a time period between $\frac{1}{1000}$ second and several seconds. The image charge is then swept from the photosites in the image sensor 12, converted to a digital format, and written into the image buffer 18. The driving signals provided by the control processor 20 to the image sensor 12, the A/D converter 16 and the buffer 18 are accordingly generated to achieve such a transfer. The processing throughput rate of the interpolation and recording section 4 is determined by the speed of the digital signal processor 22.

One desirable consequence of this architecture is that the processing algorithm employed in the interpolation and recording section may be selected for quality treatment of the image rather than for throughput speed. This, of course, can put a delay between consecutive pictures which may affect the user, depending on the time between photographic events. This is a problem since it is well known and understood in the field of electronic imaging that a digital still camera should provide a continuous shooting capability for a successive sequence of images. For this reason, the image buffer 18 shown in FIG. 1 provides for storage of a plurality of images, in effect allowing a series of images to "stack up" at video rates. The size of the buffer is established to hold enough consecutive images to cover most picture-taking situations.

An operation display panel 30 is connected to the control processor 20 for displaying information useful in operation of the electronic still camera 1. Such information might include typical photographic data, such as shutter speed, aperture, exposure bias, color balance (auto, tungsten, fluorescent, daylight), field/frame, low battery, low light, exposure modes (aperture preferred, shutter preferred), and so on. Moreover, other information unique to this type of electronic still camera 1 is displayed. For instance, the removable memory card 24 would ordinarily include a directory signifying the beginning and ending of each stored image. This would show on the display panel 30 as either (or both) the number of images stored or the number of image spaces remaining, or estimated to be remaining.

The digital signal processor 22 interpolates each still video image stored in the image buffer 18 according to the interpolation technique shown in FIG. 2. The interpolation of missing data values at each pixel location follows the sequence shown in FIG. 2, as will later be discussed.

In the implementation shown in FIG. 2, the digital signal processor 22 provides an adaptive interpolation technique to provide a compute luminance function shown as luminance values block 32 for optimizing luminance values as will be described hereinafter in connection with FIG. 3A. After the luminance values are computed then a chrominance values block 34 computes the chrominance values of each pixel based upon the computed final luminance values. Finally an RGB values block 36 computes the image in Red(R), Green(G), Blue(B) format which are used for an image display or for making a hard copy output. Although this disclosure is in reference to computing red, green, and blue values, it will be understood that it is also applicable to other color spaces such as cyan, magenta, and yellow. Another color space that can be used is to use luminance and chrominance values which are typically referred to as YCC color spaces. The Y refers to luminance and the two C's refer to chrominance.

Figure 3A:
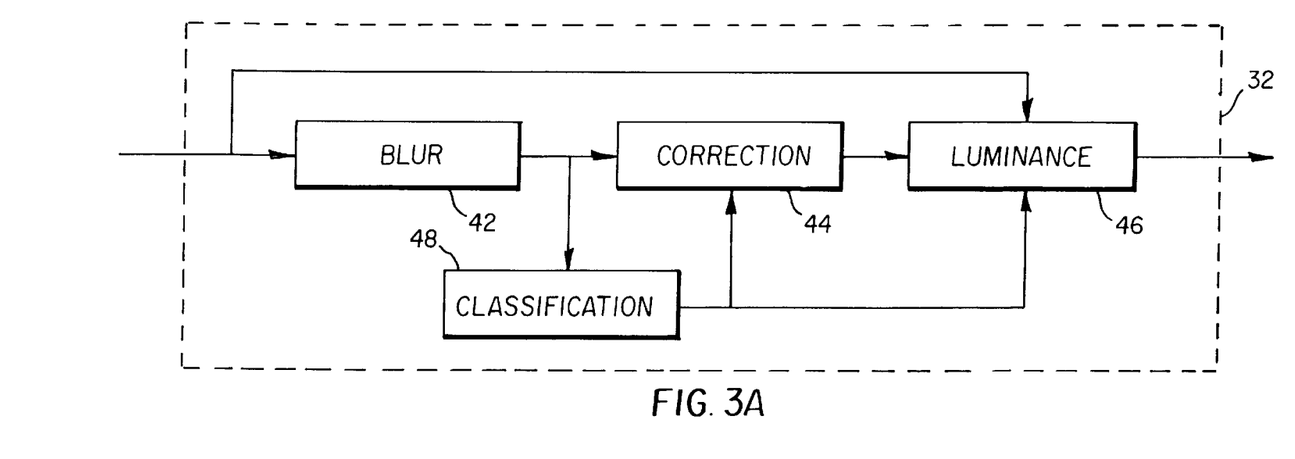
FIGS. 3A and 3B respectively show detailed block diagrams of the luminance values block 32 and the chrominance values block 34 shown in FIG. 2.
Figure 4:
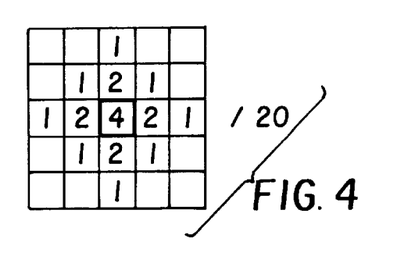
FIG. 4 depicts a kernel used in computing low frequency luminance values.

Turning now to FIG. 3A where the luminance values block 32 is shown in more detail. A digital image from the image buffer 18 of FIG. 1 is applied to a blur block 42 which computes low frequency luminance values. The purpose of blur block 42 is to remove the high frequency components from the digital image. Reference will now be made to FIG. 4 where a 5×5 blur kernel arrangement is shown. For any given pixel which is selected as the center pixel of a 5×5 kernel it is assigned value weight of 4. Pixels which surround the kernel of interest are also assigned different values. These values shown in FIG. 4 are representative and those skilled in the art will appreciate that other values can be selected which will also provide an appropriate blur function. Note that once the weighted sum is computed is divided by 20, which is the sum of all the weights in the blur kernel. The following equations depict how these kernel values are used to compute each pixel in a digital image which has high frequency components removed.

If the recorded CFA color values are:

$$\begin{matrix} A_{11} & A_{12} & A_{13} & A_{14} & A_{15} \\ A_{21} & A_{22} & A_{23} & A_{24} & A_{25} \\ A_{31} & A_{32} & A_{33} & A_{34} & A_{35} \\ A_{41} & A_{42} & A_{43} & A_{44} & A_{45} \\ A_{51} & A_{52} & A_{53} & A_{54} & A_{55} \end{matrix}$$

then the following equations show how the blur kernel values of FIG. 4 are used to produce the blurred luminance value $B_{33}$ for the center pixel above.

$$B_{33} = \begin{pmatrix} & & 1^*A_{13} + & & \\ & 1^*A_{22} + & 2^*A_{23} + & 1^*A_{24} + & \\ 1^*A_{31} + & 2^*A_{32} + & 4^*A_{33} + & 2^*A_{34} + & 1^*A_{35} + \\ & 1^*A_{42} + & 2^*A_{43} + & 1^*A_{44} + & \\ & & 1^*A_{53} & & \end{pmatrix} / 20$$

The output of blur block 42 is applied to correction block 44 and classification block 48. The computation provided by correction block 44 will now be described.

If the blurred luminance values are:

$$\begin{matrix} B_{11} & B_{12} & B_{13} & B_{14} & B_{15} \\ B_{21} & B_{22} & B_{23} & B_{24} & B_{25} \\ B_{31} & B_{32} & B_{33} & B_{34} & B_{35} \\ B_{41} & B_{42} & B_{43} & B_{44} & B_{45} \\ B_{51} & B_{52} & B_{53} & B_{54} & B_{55} \end{matrix}$$

then the following equations show how the horizontal (horz) and vertical (vert) classifiers are computed for the center pixel.

$$\text{horz}=\text{Abs}(u-w)+\text{Abs}(u-2^*v+w)$$

where the term $(u - w)$ is a gradient value, the term $(u - 2^*v + w)$ is a Laplacian second-order value, $u = B_{31}$, $v = B_{33}$, $w = B_{35}$.

$$\text{vert}=\text{Abs}(u-w)+\text{Abs}(u-2^*v+w)$$

where $u = B_{13}$, $v = B_{33}$, $w = B_{53}$.

Figure 5A:
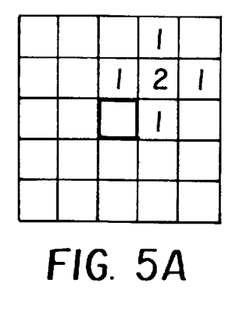
FIGS. 5A–C depict pixel weights used in computing a classifier in the classification block 48 shown in FIGS. 3A and 3B.
Figure 5B:
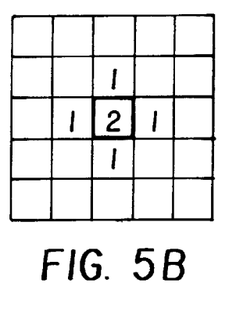
Figure 5C:
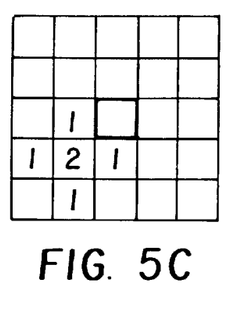
Figure 6A:
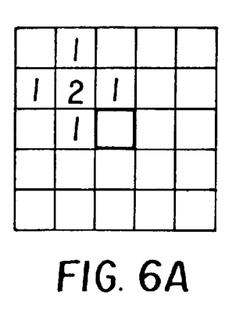
FIGS. 6A–C also depict pixel weights used in computing another classifier produced by the classification block 48.
Figure 6B:
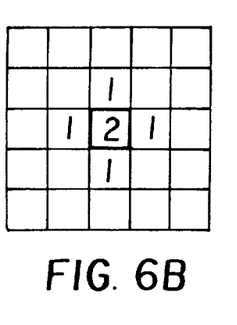
Figure 6C:
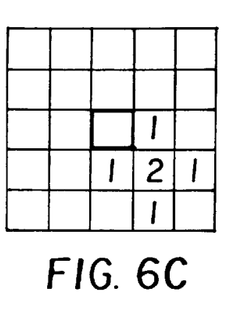

The two diagonal orientations will be named diag1 and diag2 and correspond to a diagonal line of slope 1 (connecting lower left to upper right) and a diagonal line of slope −1 (connecting upper left to lower right) respectively. The classifiers for diag1 and diag2 are computed using the kernel values shown in FIGS. 5A–5C and FIGS. 6A–6C respectively. The classifier equations using said kernel values are as follows:

$$\text{diag1}=(\text{Abs}(u-w)+\text{Abs}(u-2^*v+w))/3$$

where $$u = \begin{pmatrix} & 1^*B_{14} + & \\ 1^*B_{23} + & 2^*B_{24} + & 1^*B_{25} + \\ & 1^*B_{34} & \end{pmatrix}$$

$$v = \begin{pmatrix} & 1^*B_{23} + & \\ 1^*B_{32} + & 2^*B_{33} + & 1^*B_{34} + \\ & 1^*B_{43} & \end{pmatrix}$$

$$w = \begin{pmatrix} & 1^*B_{32} + & \\ 1^*B_{41} + & 2^*B_{42} + & 1^*B_{43} + \\ & 1^*B_{52} & \end{pmatrix}$$

and $$\text{diag2}=(\text{Abs}(u-w)+\text{Abs}(u-2^*v+w))/3$$

where $$u = \begin{pmatrix} & 1^*B_{12} + & \\ 1^*B_{21} + & 2^*B_{22} + & 1^*B_{23} + \\ & 1^*B_{32} & \end{pmatrix}$$

$$v = \begin{pmatrix} & 1^*B_{23} + & \\ 1^*B_{32} + & 2^*B_{33} + & 1^*B_{34} + \\ & 1^*B_{43} & \end{pmatrix}$$

$$w = \begin{pmatrix} & 1^*B_{34} + & \\ 1^*B_{43} + & 2^*B_{44} + & 1^*B_{45} + \\ & 1^*B_{54} & \end{pmatrix}$$

Figure 7A:
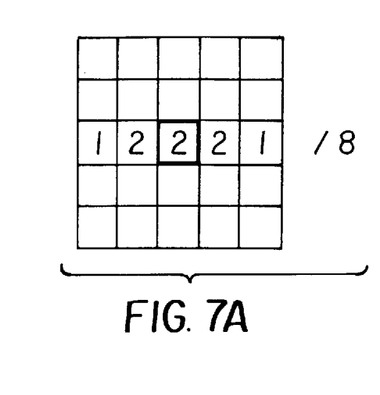
FIGS. 7A–7E respectively show the kernel weights for predicting luminance for pixels which have been classified as horizontal, vertical, flat, diag1, and diag2.
Figure 7B:
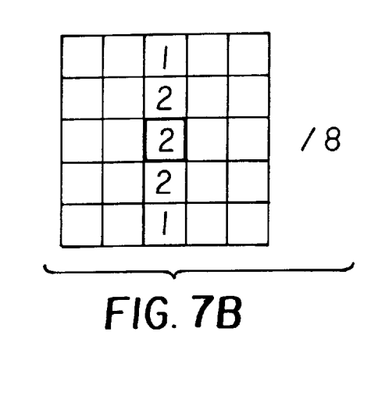
Figure 7C:
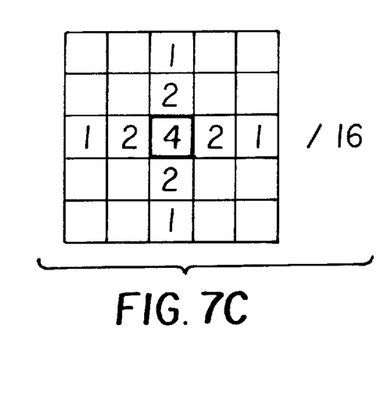

If a pixel's horizontal and vertical classifier are both less than a fixed threshold, such as 24, the pixel is classified as "flat" and the flat predictor is used (see FIG. 7C). Otherwise, a pixel's classification is determined by the smallest classifier which indicates the preferred orientation of interpolation such as horizontal, vertical, diag1, or diag2.

Figure 7D:
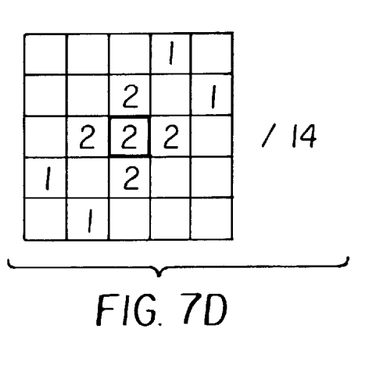
Figure 7E:
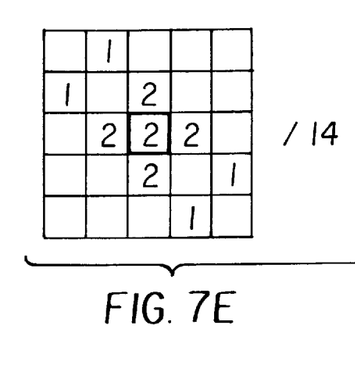

The predictors for interpolating in the preferred orientations horizontal, vertical, diag1, and diag2 are shown in FIGS. 7A, 7B, 7D, and 7E, respectively. For a specific example, suppose the classifier values for horizontal, vertical, diag1, and diag2 were 32, 20, 18, and 25, respectively. Because the horizontal classifier 32 exceeds the threshold of 24, the pixel is not classified as "flat." So then the minimum value 18 being the diag1 classifier determines that the preferred direction for interpolation is diag1. Using the predictor kernel weights for the diag1 direction (FIG. 7D), the predicted luminance value V33 would be:

$$V_{33} = \begin{pmatrix} & & & 1^*A_{14} + & & \\ & & 2^*A_{23} + & & 1^*A_{25} + & \\ & 2^*A_{32} + & 2^*A_{33} + & 2^*A_{34} + & & \\ 1^*A_{41} + & & 2^*A_{43} + & & & \\ & & 1^*A_{52} & & & \end{pmatrix} / 14$$

The operation of correction block 44 will now be discussed. The luminance correction term for a pixel depends on its classification and the computed blurred luminance values. A pixel classified as "flat" has a zero luminance correction. The other correction terms are determined as follows:

horz: $C=(-B_{31}+2^*B_{33}-B_{35})$ vert: $C=(-B_{13}+2^*B_{33}-B_{53})$ diag1: $C=(-B_{15}+2^*B_{33}-B_{51})$ diag2: $C=(-B_{11}+2^*B_{33}-B_{55})$ Whichever correction term (C) is used, it is then multiplied by a constant such as 3/8 and substituted into the following function:

$$\text{correction} = \begin{cases} \text{Max}(\text{Min}(0, x+6), -54) & \text{if } x < 0 \\ \text{Min}(\text{Max}(0, x-6), 54) & \text{if } 0 \leq x \end{cases}$$

where $x = C^*(3/8)$.

Figure 8A:
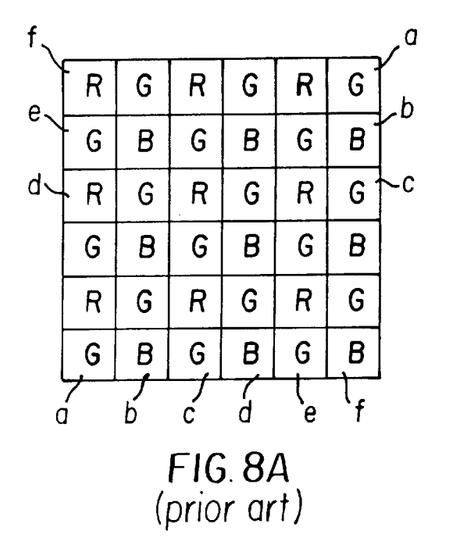
FIG. 8A shows a prior art pixel pattern.
Figure 8B:
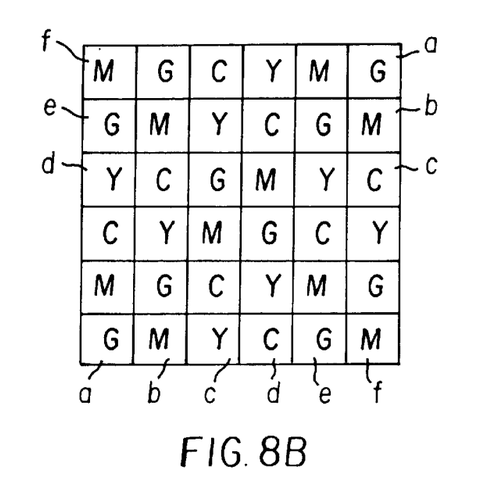
FIG. 8B shows a pixel array pattern which is suitable for chrominance correction.

Referring to FIG. 8B, the color filter array filters used are cyan (C), magenta (M), yellow (Y), and green (G). Luminance (V) can be defined equivalently in two ways, one using C and Y, the other using M and G. The equations are:

$V=(Y+C)/2$ and $V=(M+G)/2$

The two chrominance values Ca and Cb are defined as:

$Ca=(Y-C)/2$ and $Cb=(M-G)/2$

From these equations it can be determined that:

$Ca = Y - V \quad Cb = M - V$ $Ca = V - C \quad Cb = V - G$

Figure 3B:
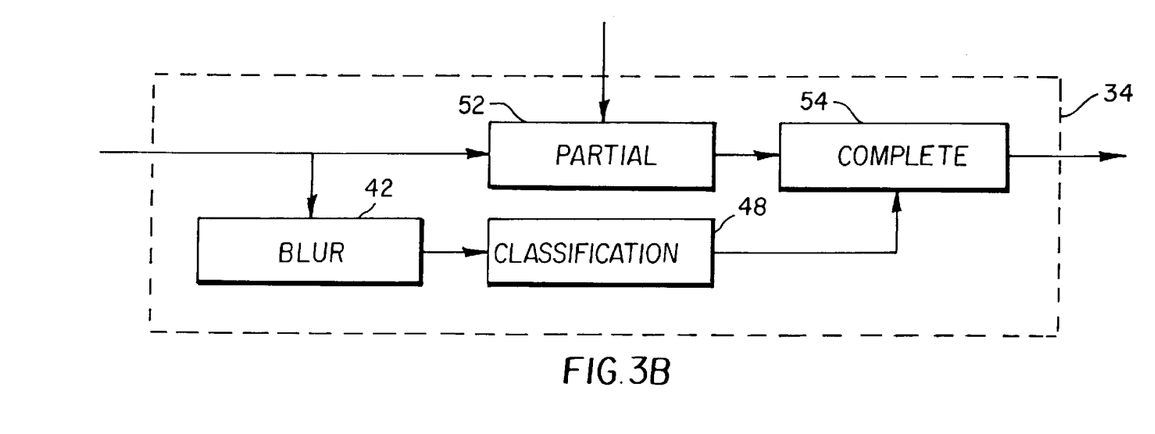

FIG. 3B which shows in detail the chrominance values block 34 shown in FIG. 2. Where parts correspond to FIG. 3A, the same numerals will be used. The color filter array data is applied to a partial block 52 which also receives luminance values as shown in FIG. 2. The purpose of the partial block is to provide a computation which provides chroma values that are completed by the complete block 54. The complete block 54 also receives an input from the classification block 48.

Because the luminance interpolation has already been completed, each pixel location has an interpolated luminance value in addition to its original CFA color value (C, M, Y, or G). The pixels having Y or C can now use the interpolated luminance V in one of the above equations to compute Ca in the partial block 52. Similarly, the pixels having M or G can use the interpolated luminance V to compute Cb in the partial block 52. Thus, each pixel now has an interpolated luminance value and one interpolated chrominance value. This input is applied to the complete block 54.

Since the M and G pixels form 2×2 sub-blocks, as do the Y and C pixels (see FIG. 8B), the chrominance values Ca and Cb are computed on these same sub-blocks. That means that following the array shown in FIG. 8B, the known Ca and Cb values, computed in partial block 52, are arranged as follows:

| Cb | Cb | Ca | Ca | Cb | Cb |
|----|----|----|----|----|----|
| Cb | Cb | Ca | Ca | Cb | Cb |
| Ca | Ca | Cb | Cb | Ca | Ca |
| Ca | Ca | Cb | Cb | Ca | Ca |
| Cb | Cb | Ca | Ca | Cb | Cb |
| Cb | Cb | Ca | Ca | Cb | Cb |

Figure 9:
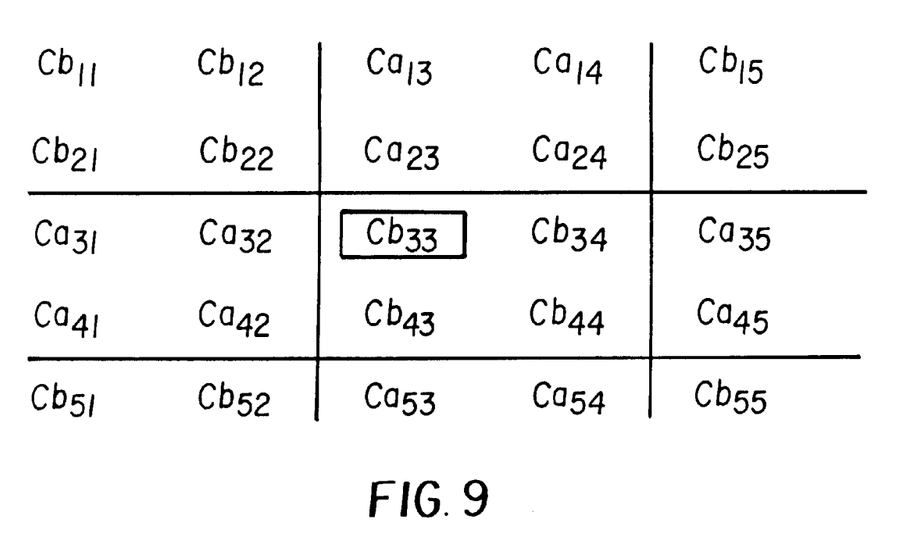
FIG. 9 depicts a block of interpolated chrominance values.

Referring to FIG. 9, which illustrates the operation of the complete block 54, the upper left 5×5 block of this array of chrominance values is shown. The center pixel already has an interpolated value for Cb and needs to get an interpolated value for Ca. Any pixel needing a value of Ca has a neighbor to the left (one or two steps away), a neighbor to the right (one or two steps away), a neighbor above (one or two steps away), a neighbor below (one or two steps away), and two neighbors touching on opposite corners (either top left and bottom right, or top right and bottom left) and all having an interpolated value for Ca. If the pixel was originally classified as flat or horizontal, the two values in the horizontal direction (at the right and left neighbors) are averaged and become the interpolated value for Ca. If the pixel was classified as vertical, then the values of Ca above and below are averaged to become the interpolated value for Ca. If the pixel was classified either as diag1 or diag2, the two values from opposite corners are averaged to become the interpolated value for Ca.

For example, if the center pixel (FIG. 9) were classified flat or horizontal the interpolation equation would be:

$Ca_{33}=(Ca_{32}+Ca_{35})/2$

If the center pixel were classified as vertical the interpolation equation would be:

$Ca_{33}=(Ca_{23}+Ca_{53})/2$

If the center pixel were classified as diag1 or diag2 the interpolation equation would be:

$Ca_{33}=(Ca_{24}+Ca_{42})/2$

Any other pixel needing an interpolated value for Ca may be processed in a similar manner. Furthermore, each pixel needing an interpolated value for Cb may also be processed in a similar way with the roles of Ca and Cb reversed. When this step is done, every pixel has a luminance and two chrominance values, and the interpolation process is complete.

For each pixel the conversion to red, green, and blue values (see RGB values block 36, FIG. 2) is accomplished by the following equations:

$$R = V + 2^*Ca + Cb$$
$$G = V \phantom{+ 2^*Ca} - Cb$$
$$B = V - 2^*Ca + Cb$$

The present invention is applicable to a digital color image value originally obtained from an image sensor or the like and has color image pixels aligned in rows and columns to define repeating kernels having diagonal pixels with sufficient information to permit luminance estimation the digital image having at least three separate color values but only one color value for each image pixel location. For example, the so-called Bayer array generally takes the format shown in FIG. 8A. With this format, there is insufficient luminance (i.e., green) information along certain diagonals labeled as b, d, and f of FIG. 8A. With other diagonals, there is complete information. They are labeled a, c, and e. The array pattern shown in U.S. Pat. No. 5,631,703 has sufficient information (i.e., magenta and green values or cyan and yellow values) along all its diagonals (e.g., a–e of FIG. 8B) and so is especially suitable for use with the present invention.

The present invention can be embodied in a computer program stored on a computer readable product such as, for example, magnetic storage media, such as a magnetic disk (for example, a floppy disk), magnetic tape, optical disks, optical tape, or machine readable memory.

The invention has been described in detail with particular reference to certain preferred embodiments thereof, but it will be understood that variations and modifications can be effected within the spirit and scope of the invention.

| PARTS LIST | |
|---|---|
| 2 | input section |
| 4 | recording section |
| 10 | exposure section |
| 12 | image sensor |
| 13 | color filter array |
| 14 | output diode |
| 16 | A/D converter |
| 18 | image buffer |
| 20 | control processor |
| 22 | digital signal processor |
| 24 | removable memory card |
| 26 | connector |
| 28 | processing buffer |
| 30 | display panel |
| 32 | luminance values block |
| 36 | luminance section |
| 38 | chroma section |
| 40 | select best luma interpolation |
| 42 | blur block |
| 44 | correction block |
| 46 | luminance block |
| 48 | classification block |

| -continued | |
|---|---|
| PARTS LIST | |
| 52 | partial block |
| 54 | complete block |

What is claimed is:

1. In apparatus for processing a digital color image value originally obtained from an image sensor or the like having color image pixels aligned in rows and columns having diagonal pixels with sufficient information to permit luminance estimation the digital image having at least three separate color values but only one color value for each image pixel location, such apparatus computing the luminance values for each image pixel, comprising:

means for storing the digital image;

processor means operative with said storing means and responsive to said stored measured digital color image values for computing low frequency luminance values;

means responsive to the computed low frequency luminance values for obtaining Laplacian second-order and gradient values in at least two image orientations from neighboring image pixels;

means for combining the Laplacian second-order and the gradient values to define a value for each image pixel in the kernel such that there are sets of values with each value corresponding to a classifier and for selecting a preferred orientation from a group of orientations for the interpolation based upon the classifier; and means responsive to the preferred orientation and the measured digital image for estimating a portion of the color specification for each corresponding image pixel.

2. In apparatus for processing a digital color image value originally obtained from an image sensor or the like having color image pixels aligned in rows and columns having diagonal pixels with sufficient information to permit luminance estimation the digital image having at least three separate color values but only one color value for each image pixel location, such apparatus computing the luminance values for each image pixel, comprising:

means for storing the digital image;

processor means operative with said storing means and responsive to said stored measured digital color image values for computing low frequency luminance values;

means responsive to the computed low frequency luminance values for obtaining Laplacian second-order and gradient values in at least two image orientations from neighboring image pixels;

means for combining the Laplacian second-order and the gradient values to define a value for each image pixel such that there are sets of values with each value corresponding to a classifier and for selecting a preferred orientation from a group of orientations for the interpolation based upon the classifier; and means responsive to the preferred orientation and the measured digital image for estimating the luminance value for each corresponding image pixel.

3. The apparatus of claim 1 wherein there are at least two possible selected orientations which include horizontal and vertical.

4. The apparatus of claim 1 wherein there at least four possible selected orientations which include horizontal, vertical, and first and second diagonals.

5. The apparatus of claim 4 further including means for selecting the smallest classifier which determines the selected orientation and corresponds to the predictor.

6. In apparatus for processing a measured digital color image value originally obtained from an image sensor having color image pixels aligned in rows and columns the image sensor generating at least three separate color values but only one color value for each image pixel location, such apparatus computing the luminance values for each image pixel, comprising:

means for storing the measured digital color image value;

processor means operative with said storing means and responsive to said stored measured digital color image values for computing low frequency luminance values;

means responsive to the computed low frequency luminance values for obtaining Laplacian second-order and gradient values in at least two image orientations from neighboring image pixels;

means for combining the Laplacian second-order and the gradient values to define a value for each image pixel such that there are sets of values with each value corresponding to a classifier and for selecting a preferred orientation from a group of orientations including flat, horizontal, vertical, and first and second diagonal orientations for the interpolation based upon the classifier; and means responsive to the preferred orientation and the measured digital image for determining the luminance value for each corresponding image pixel.

7. The apparatus of claim 6 further including means for using the smallest classifiers and when the horizontal and vertical classifiers are below a predetermined threshold level for selecting the flat orientation and when the smallest classifier corresponds to the horizontal, vertical, and first and second diagonals for selecting one of those orientations as the preferred orientation.

8. The apparatus according to claim 7 including means responsive to the selected orientation being flat to compute the average of the horizontal and vertical for computing a predictor which is used in determining the luminance value for each corresponding image pixel.

9. In apparatus for processing a measured digital color image value originally obtained from an image sensor having color image pixels aligned in rows and columns the image sensor generating at least three separate color values but only one color value for each image pixel location, such apparatus computing the luminance values for each image pixel, comprising:

means for storing the measured digital color image value;

processor means operative with said storing means and responsive to said stored measured digital color image values for computing low frequency luminance values;

means responsive to the computed low frequency luminance values for obtaining Laplacian second-order and gradient values in at least two image orientations from neighboring image pixels;

means for adding the Laplacian second-order and the gradient values to define a value for each image pixel such that there are sets of values with each value corresponding to a classifier and for selecting a preferred orientation from a group of orientations including flat, horizontal, vertical, and first and second diagonal orientations for the interpolation based upon the classifier; and means responsive to the preferred orientation and the measured digital image for determining the luminance value for each corresponding image pixel.

10. A computer program, product, comprising a computer readable storage medium including program means comprising:

a) means for processing a digital color image value originally obtained from an image sensor or the like having color image pixels aligned in rows and columns having diagonal pixels with sufficient information to permit luminance estimation the digital image having at least three separate color values but only one color value for each image pixel location; and b) means for computing the luminance values for each image pixel, including:
  i) means for storing the digital image;
  ii) processor means operative with said storing means and responsive to said stored measured digital color image values for computing low frequency luminance values;
  iii) means responsive to the computed low frequency luminance values for obtaining,Laplacian second-order and gradient values in at least two image orientations from neighboring image pixels;
  iv) means for combining the Laplacian second-order and the gradient values to define a value for each image pixel in the kernel such that there are sets of values with each value corresponding to a classifier and for selecting a preferred orientation from a group of orientations for the interpolation based upon the classifier; and
  v) means responsive to the preferred orientation and the measured digital image for estimating the luminance value for each corresponding image pixel.

11. In apparatus for processing a digital color image value originally obtained from an image sensor or the like having color image pixels aligned in rows and columns having diagonal pixels with sufficient information to permit luminance estimation the digital image having at least three separate color values but only one color value for each image pixel location, such apparatus computing the luminance values for each image pixel, comprising:

means for storing the digital image;

processor means operative with said storing means and responsive to said stored measured digital color image values for computing low frequency luminance values;

means responsive to the computed low frequency luminance values for obtaining Laplacian second-order and gradient values in at least two image orientations from neighboring image pixels;

means for combining the Laplacian second-order and the gradient values to define a value for each image pixel in the kernel such that there are sets of values with each value corresponding to a classifier and for selecting a preferred orientation from a group of orientations for the interpolation based upon the classifier; and means responsive to the preferred orientation and the measured digital image for estimating the chrominance value for each corresponding image pixel.

12. The apparatus of claim 1 wherein there are at least two possible selected orientations which include horizontal and vertical.

13. The apparatus of claim 1 wherein there at least four possible selected orientations which include horizontal, vertical, and first and second diagonals.

14. The apparatus of claim 3 further including means for selecting the smallest classifier which determines the selected orientation and corresponds to the predictor.

15. In apparatus for processing a measured digital color image value originally obtained from an image sensor having color image pixels aligned in rows and columns the image sensor generating at least three separate color values but only one color value for each image pixel location, such apparatus computing the luminance values for each image pixel, comprising:

means for storing the measured digital color image value;

processor means operative with said storing means and responsive to said stored measured digital color image values for computing low frequency luminance values;

means responsive to the computed low frequency luminance values for obtaining Laplacian second-order and gradient values in at least two image orientations from neighboring image pixels;

means for combining the Laplacian second-order and the gradient values to define a value for each image pixel such that there are sets of values with each value corresponding to a classifier and for selecting a preferred orientation from a group of orientations including flat, horizontal, vertical, and first and second diagonal orientations for the interpolation based upon the classifier; and means responsive to the preferred orientation and the measured digital image for determining the chrominance value for each corresponding image pixel.

16. The apparatus of claim 15 further including means for using the smallest classifiers and when the horizontal and vertical classifiers are below a predetermined threshold level for selecting the flat orientation and when the smallest classifier corresponds to the horizontal, vertical, and first and second diagonals for selecting one of those orientations as the preferred orientation.

17. The apparatus according to claim 16 including means responsive to the selected orientation being flat to compute the average of the horizontal and vertical for computing a predictor which is used in determining the chrominance value for each corresponding image pixel.

18. In apparatus for processing a measured digital color image value originally obtained from an image sensor having color image pixels aligned in rows and columns the image sensor generating at least three separate color values but only one color value for each image pixel location, such apparatus computing the chrominance values for each image pixel, comprising:

means for storing the measured digital color image value;

processor means operative with said storing means and responsive to said stored measured digital color image values for computing low frequency luminance values;

means responsive to the computed low frequency luminance values for obtaining Laplacian second-order and gradient values in at least two image orientations from neighboring image pixels;

means for adding the Laplacian second-order and the gradient values to define a value for each image pixel such that there are sets of values with each value corresponding to a classifier and for selecting a preferred orientation from a group of orientations including flat, horizontal, vertical, and first and second diagonal orientations for the interpolation based upon the classifier; and means responsive to the preferred orientation and the measured digital image for determining the chrominance value for each corresponding image pixel.

19. A computer program, product, comprising a computer readable storage medium including program means comprising:

a) means for processing a digital color image value originally obtained from an image sensor or the like having color image pixels aligned in rows and columns t having diagonal pixels with sufficient information to permit luminance estimation the digital image having at least three separate color values but only one color value for each image pixel location; and b) means for computing the chrominance values for each image pixel, including:
    i) means for storing the digital image;
    ii) processor means operative with said storing means and responsive to said stored measured digital color image values for computing low frequency luminance values;
    iii) means responsive to the computed low frequency luminance values for obtaining Laplacian second-order and gradient values in at least two image orientations from neighboring image pixels;
    iv) means for combining the Laplacian second-order and the gradient values to define a value for each image pixel in the kernel such that there are sets of values with each value corresponding to a classifier and for selecting a preferred orientation from a group of orientations for the interpolation based upon the classifier; and
    v) means responsive to the preferred orientation and the measured digital image for estimating the chrominance value for each corresponding image pixel.

* * * * *